(12) United States Patent
Lin

(10) Patent No.: US 8,454,213 B2
(45) Date of Patent: Jun. 4, 2013

(54) DECORATIVE LIGHTING DEVICE ATTACHED ONTO WHEEL RIM OF VEHICLE

(76) Inventor: Rocky Yi-Ping Lin, Taipei (TW)

( * ) Notice: Subject to any disclaimer, the term of this patent is extended or adjusted under 35 U.S.C. 154(b) by 817 days.

(21) Appl. No.: 12/618,999

(22) Filed: Nov. 16, 2009

(65) Prior Publication Data

US 2011/0116279 A1    May 19, 2011

(51) Int. Cl.
*B60B 7/04* (2006.01)

(52) U.S. Cl.
USPC .......... 362/500; 301/37.102; 301/37.31; 301/37.34

(58) Field of Classification Search
USPC .......... 362/500; 301/37.102, 37.31, 37.34
See application file for complete search history.

(56) References Cited

U.S. PATENT DOCUMENTS

| | | | |
|---|---|---|---|
| 4,070,915 A * | 1/1978 | Caroff | 73/487 |
| 6,220,733 B1 * | 4/2001 | Gordon | 362/500 |
| 6,386,731 B1 * | 5/2002 | Cheng | 362/192 |
| 6,774,503 B1 * | 8/2004 | Chen | 290/1 R |
| 6,936,980 B2 * | 8/2005 | Wang | 315/292 |
| 7,703,958 B2 * | 4/2010 | Christoff | 362/500 |
| 7,717,579 B2 * | 5/2010 | Huang | 362/35 |
| 7,726,746 B2 * | 6/2010 | Berens | 301/37.25 |
| 2002/0172036 A1 * | 11/2002 | Chien | 362/192 |
| 2004/0134157 A1 * | 7/2004 | Hoberman | 52/633 |
| 2006/0192422 A1 * | 8/2006 | Goodman et al. | 301/37.102 |

FOREIGN PATENT DOCUMENTS

TW    M249845    11/2004

* cited by examiner

*Primary Examiner* — Nimeshkumar Patel
*Assistant Examiner* — Christopher Raabe
(74) *Attorney, Agent, or Firm* — Chun-Ming Shih; HDLS IPR Services

(57) ABSTRACT

A decorative lighting device, adapted to be installed onto wheel rim of vehicle, includes a telescopically fixing mechanism and a light-emitting assembly connected thereon. The light-emitting assembly includes a lid plate and a plurality of light-emitting units fixed thereto. The telescopically fixing mechanism includes a support seat, a clipping-and-abutting plate connected fixedly to the support seat, a plurality of telescopic links, one end of each of which is accommodated between and pivoted to the support seat and the clipping-and-abutting plate, and another end of each of which is wedged by being fixed in a central hole of the wheel ring when extended outwardly, and a rotating wheel pivoted to the support seat and capable of driving the telescopic links to make actions of shrinking inwardly or extending outwardly. Thereby, it is possible to simplify the manner of installing a decorative lighting device or a light-emitting assembly onto a wheel rim, without doing any machining process thereto.

10 Claims, 9 Drawing Sheets

DECORATIVE LIGHTING DEVICE ATTACHED ONTO WHEEL RIM OF VEHICLE

BACKGROUND OF THE INVENTION

1. Field of the Invention

The present invention in general relates to lamps, in particular, to a light-emitting assembly installed onto a wheel rim.

2. Description of Prior Art

Accordingly, traditional lamps arranged on a vehicle are mainly adapted for the purposes of lighting and alerts, for example, headlights, brake lights, direction lights and fog lights. When these lamps are arranged, all their brightness and color have to fulfill the required regulations, before the vehicle is driven on the road.

In terms of modern, the vehicle he drives not only has superior performance, but the driver also focuses on the pursuit of personalization and innovation, letting the vehicle's appearance show unique and fashion as much as possible. However, in terms of the entire modeling or color in a vehicle, they usually are not allowed to make large-scale change because of the limitation by law. Therefore, only the wheel rim in a vehicle can be painted with colors, decorative stripes or pierced holes to be made as a modeling design. By so doing, when the vehicle is running, different color or variation is being expressed out.

However, according to the prior arts mentioned above, the design of wheel rim is unable to be expressed out clearly when the vehicle is being driven at night. So, by additionally arranging a decorative lighting device onto the wheel rim, not only the visual feeling is increased, but also an alerting function is additionally formed, when the vehicle is making a nocturnal drive. This kind of device can be found in Taiwan Patent No. M249845, in which a plurality of through holes are arranged on the wheel rim, an inner face of which are also arranged LED luminaries, so the light emitted from the LED luminaries can penetrate the through holes and make the wheel rim have light emitting from inside to outside at night. However, in implementing this kind of lighting device, the wheel rim has to make an additional machining to create the light passing through the holes. Because of this machining, not only the original form of the wheel rim is damaged, but also more trouble and difficult are incurred, really not fulfilling the requirement of practicability.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide a decorative lighting device adapted by being attached onto the wheel rim of a vehicle. According to the invention, a telescopically fixing mechanism is adopted to install a light-emitting assembly onto the wheel rim without any unnecessary machining to damage the wheel rim when the decorative lamp is additionally hanged thereon.

Secondly, the invention is to provide a decorative lighting device, adapted by being attached onto a vehicle's wheel rim having a central hole, including a telescopically fixing mechanism and a light-emitting assembly connected thereon. The telescopically fixing mechanism includes a support seat, a clipping-and-abutting plate connected fixedly to the support seat, a plurality of telescopic links, one end of each of which is accommodated between and pivoted to the support seat and the clipping-and-abutting plate, and another end of each of which is wedged by being fixed in the central hole of the wheel ring when extended outwardly, and a rotating wheel, which is pivoted to the support seat and capable of driving the telescopic links to make actions of shrinking inwardly or extending outwardly. The light-emitting assembly, connected to the telescopically fixing mechanism, includes a lid plate and a plurality of light-emitting units fixed thereto.

Compared to prior arts, the decorative lighting device attached onto a vehicle's wheel rim according to the invention is to adopt a telescopically fixing mechanism to clip and abut a light-emitting assembly fixedly into an existed central hole of the wheel rim without doing any machining process thereto, thus simplifying the manner of installing a light-emitting assembly or a decorative light device onto the wheel rim of a vehicle, significantly enhancing the practicability and convenience thereof.

BRIEF DESCRIPTION OF DRAWING

The features of the invention believed to be novel are set forth with particularity in the appended claims. The invention itself, however, may be best understood by reference to the following detailed description, which describes an embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, not used to limit its executing scope. Any equivalent variation and modification made according to appended claims is all covered by the claims claimed by the present invention.

Figure 1:
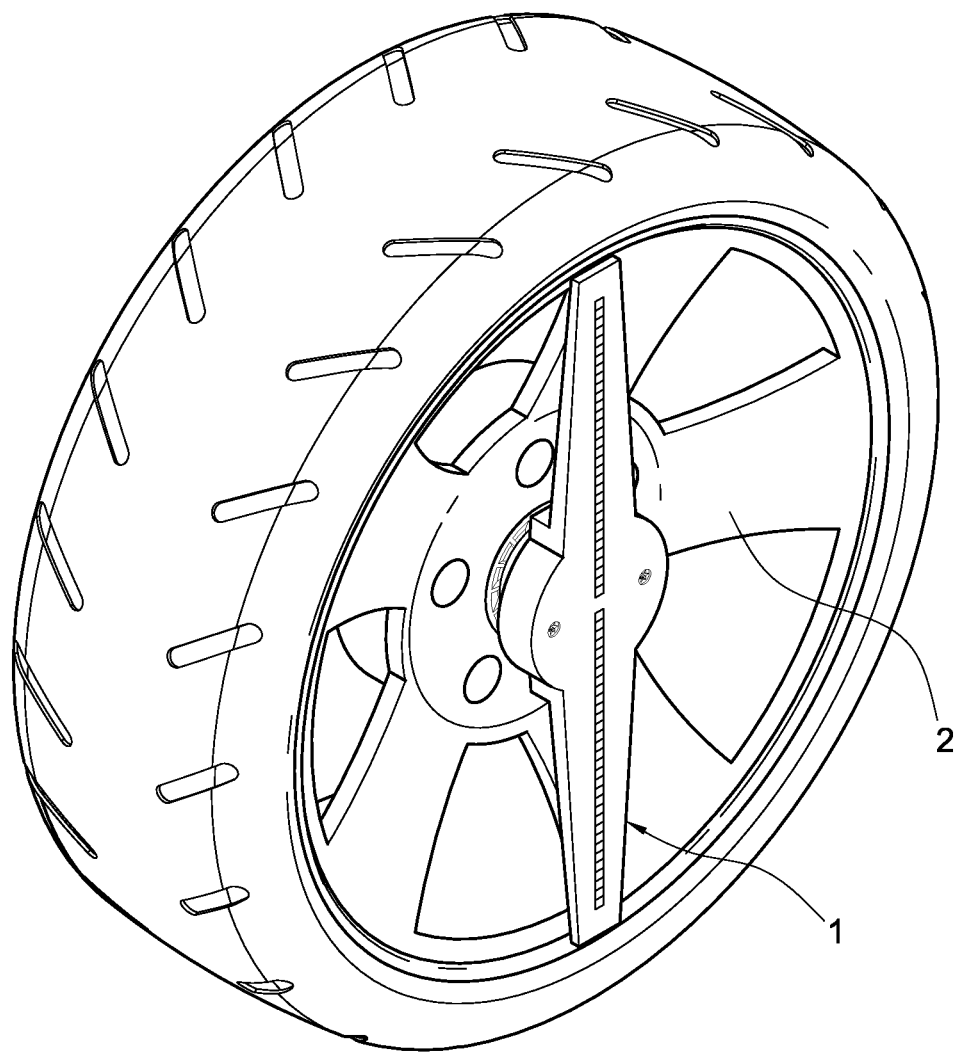
FIG. 1 is a using illustration of the decorative lighting device according to the invention attached onto the wheel rim of a vehicle.
Figure 2:
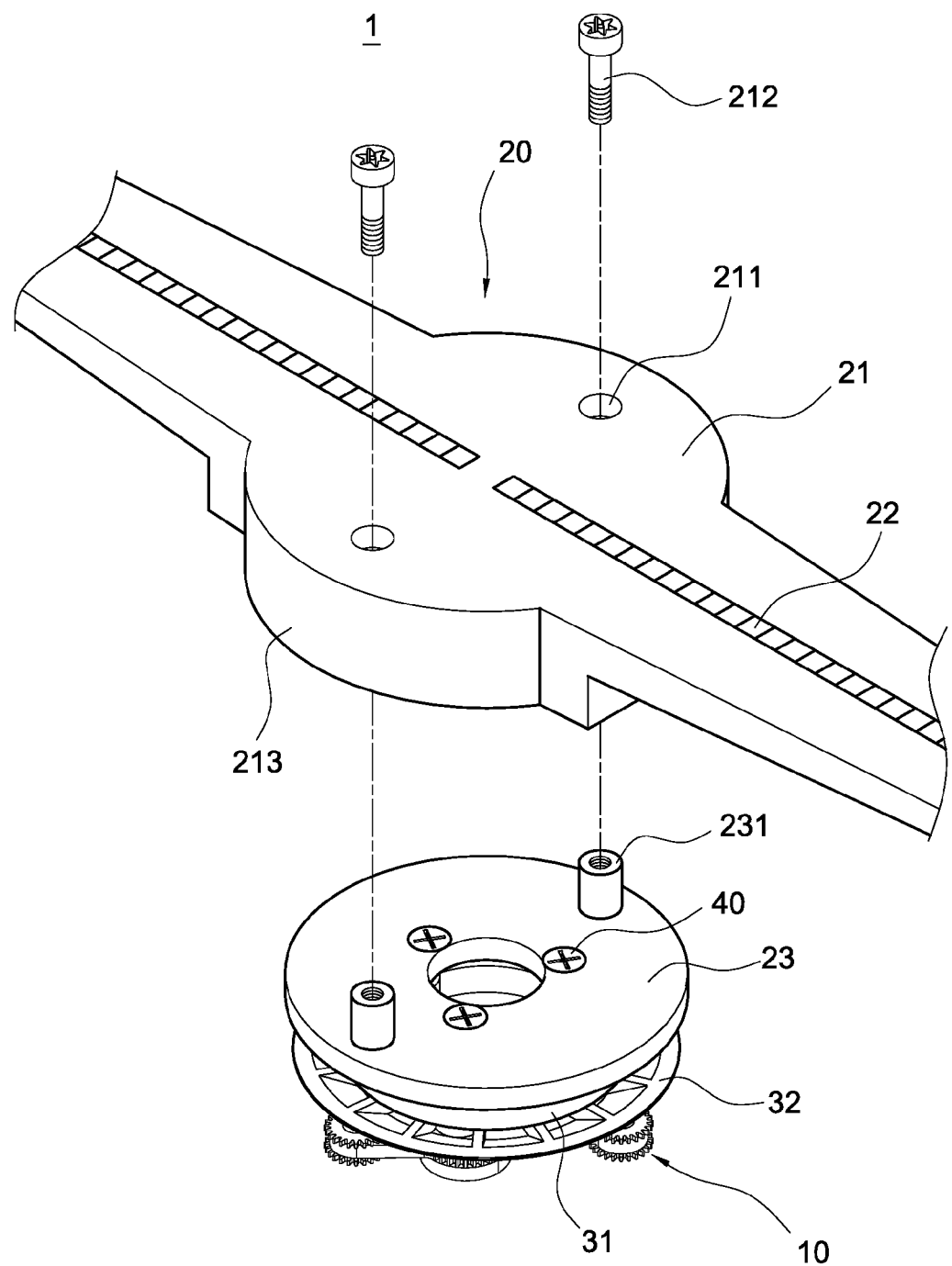
FIG. 2 is an assembled illustration of the decorative lighting device according to the invention attached onto the wheel rim of a vehicle.
Figure 3:
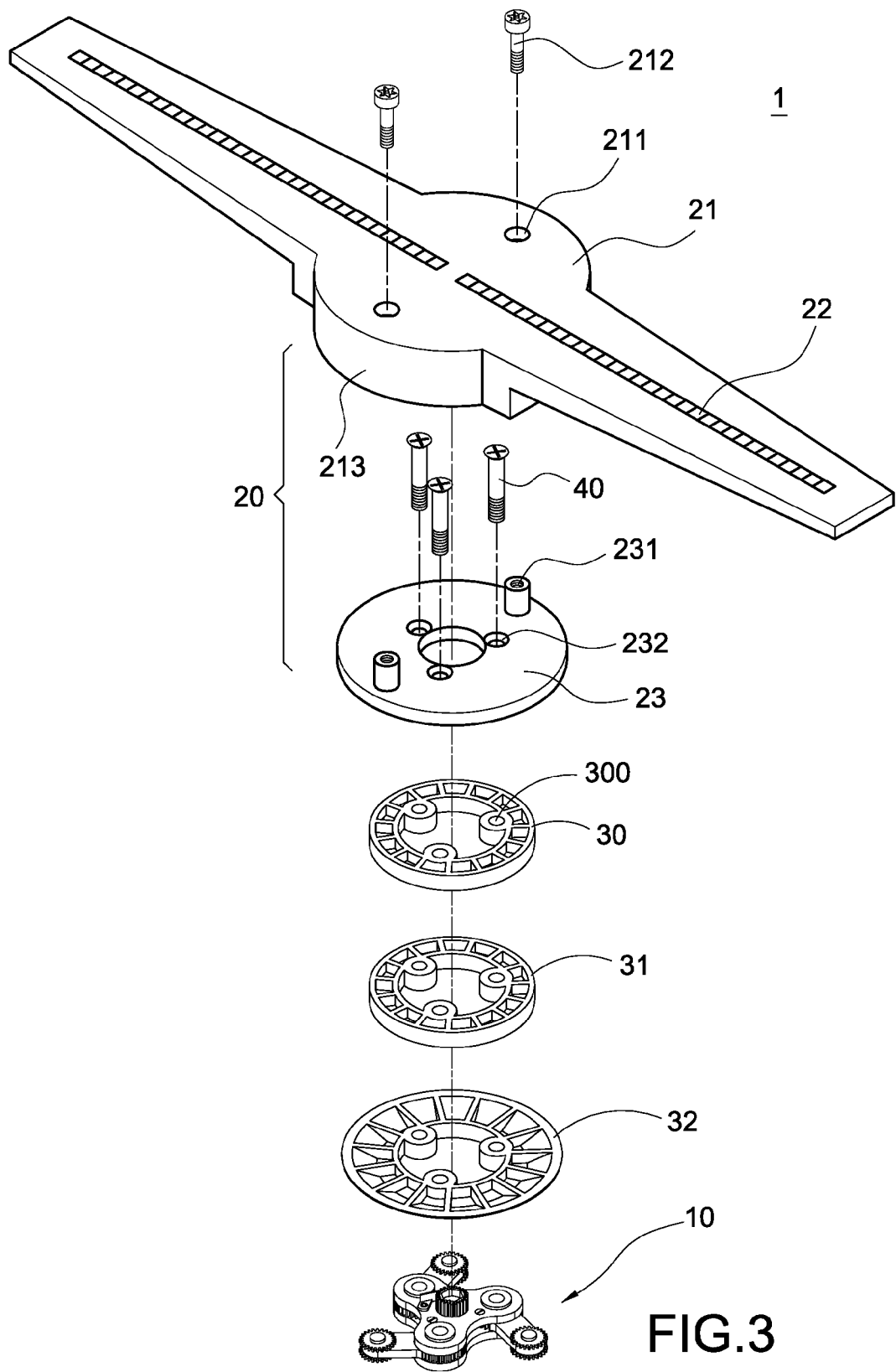
FIG. 3 is a perspective explosive illustration of the decorative lighting device according to the invention attached onto the wheel rim of a vehicle.
Figure 4:
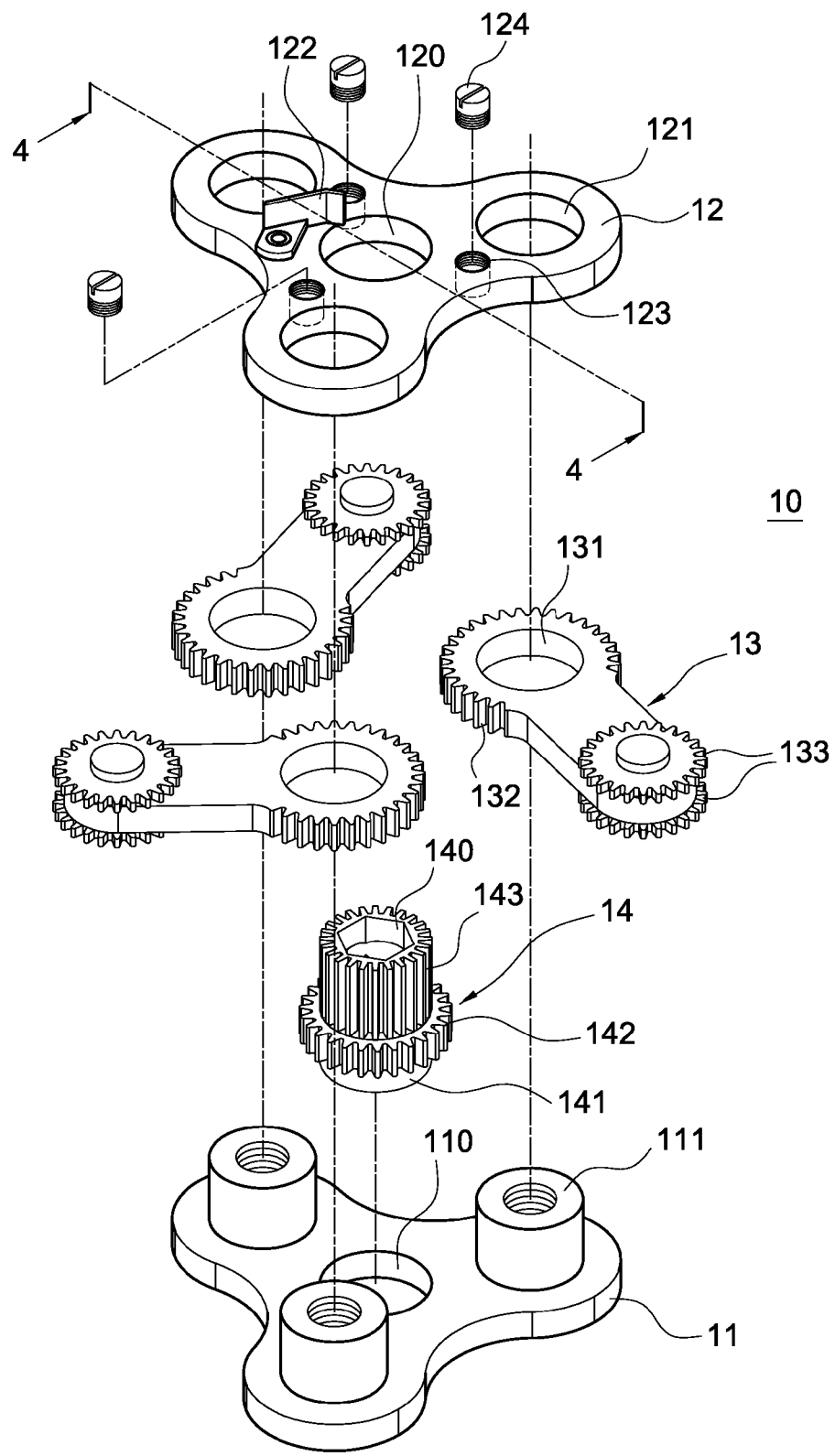
FIG. 4 is a perspective explosive illustration of the telescopically fixing mechanism according to the invention.
Figure 5:
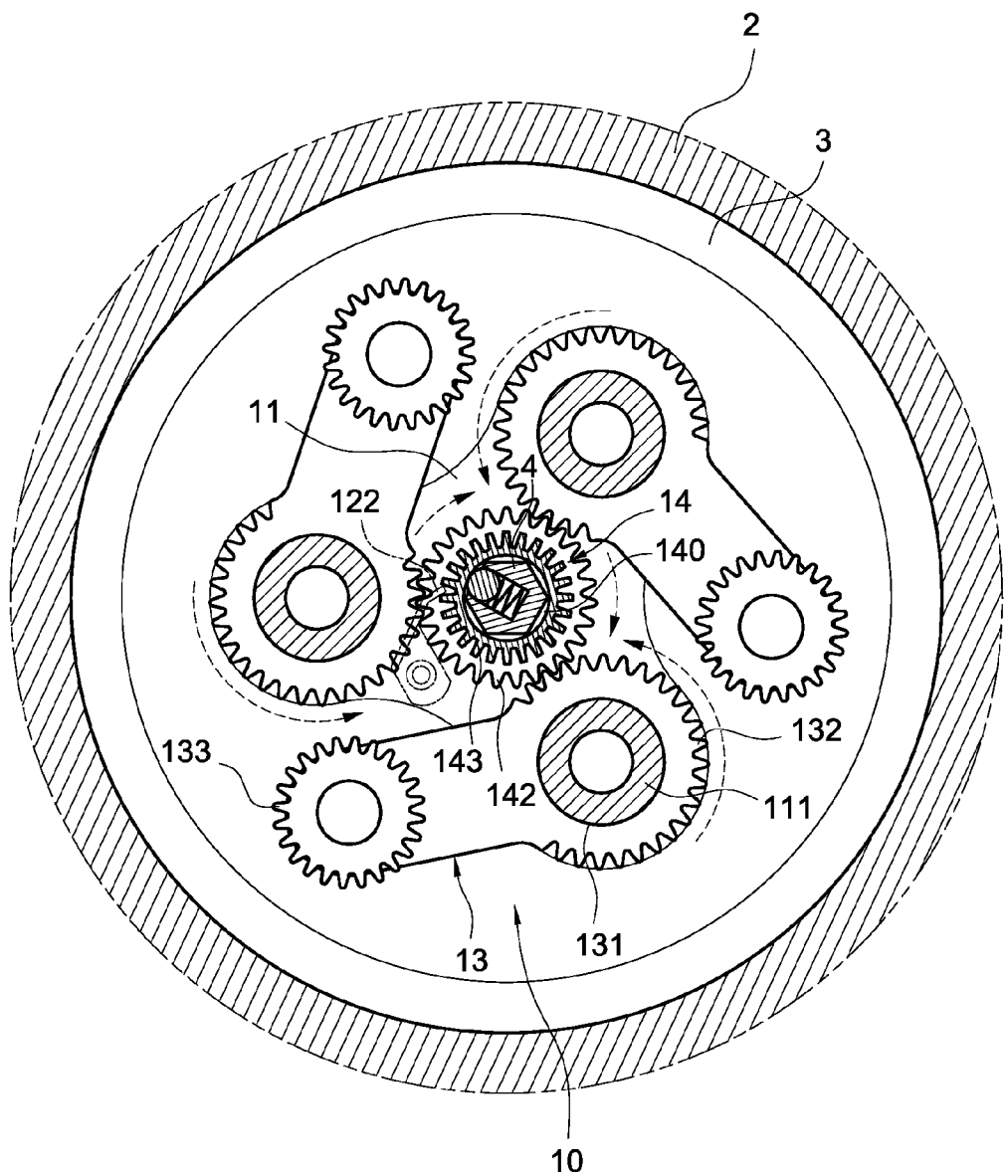
FIG. 5 is an assembled illustration of the telescopically fixing mechanism according to the invention.
Figure 6:
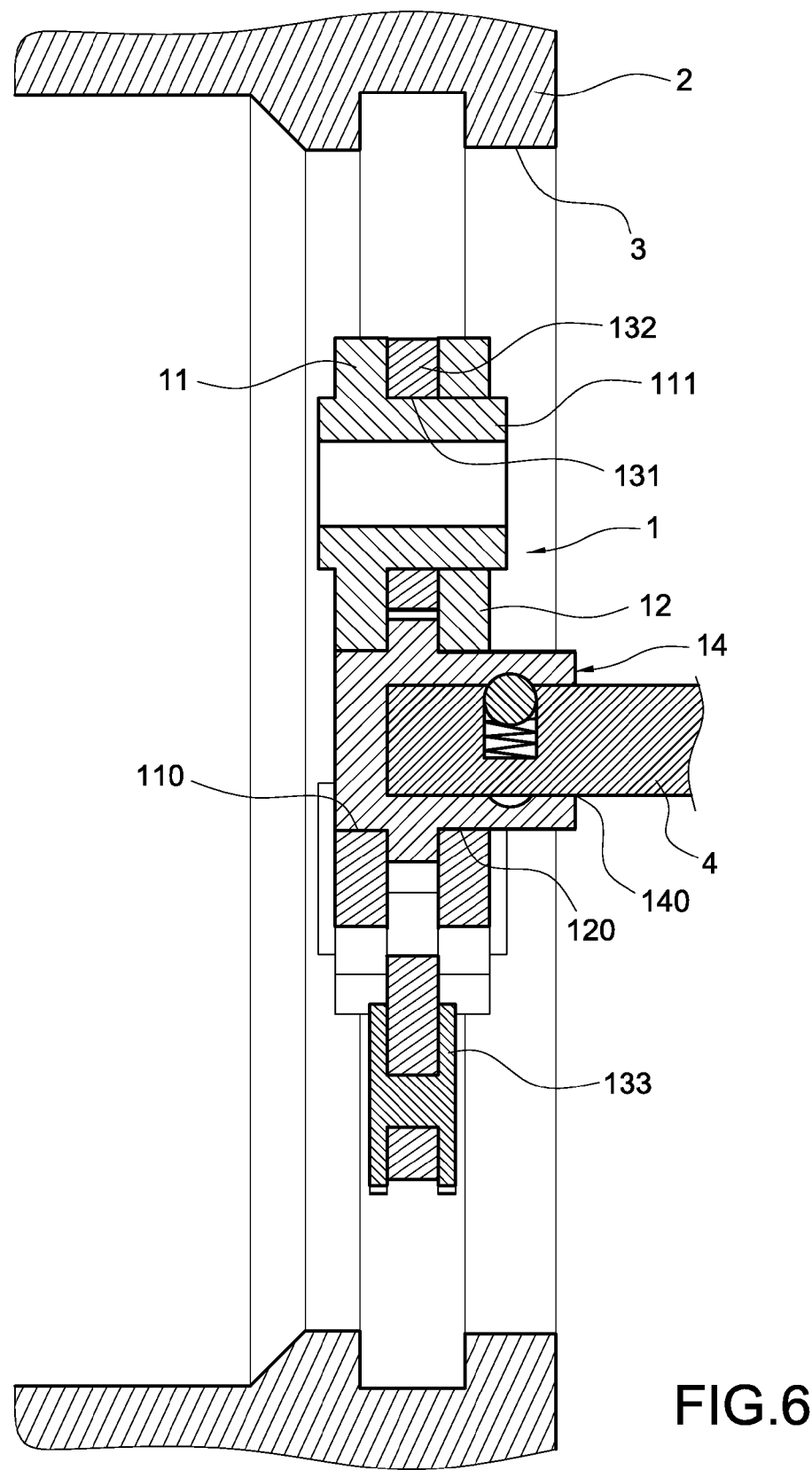
FIG. 6 is an assembled illustration of the telescopically fixing mechanism according to the invention.
Figure 7:
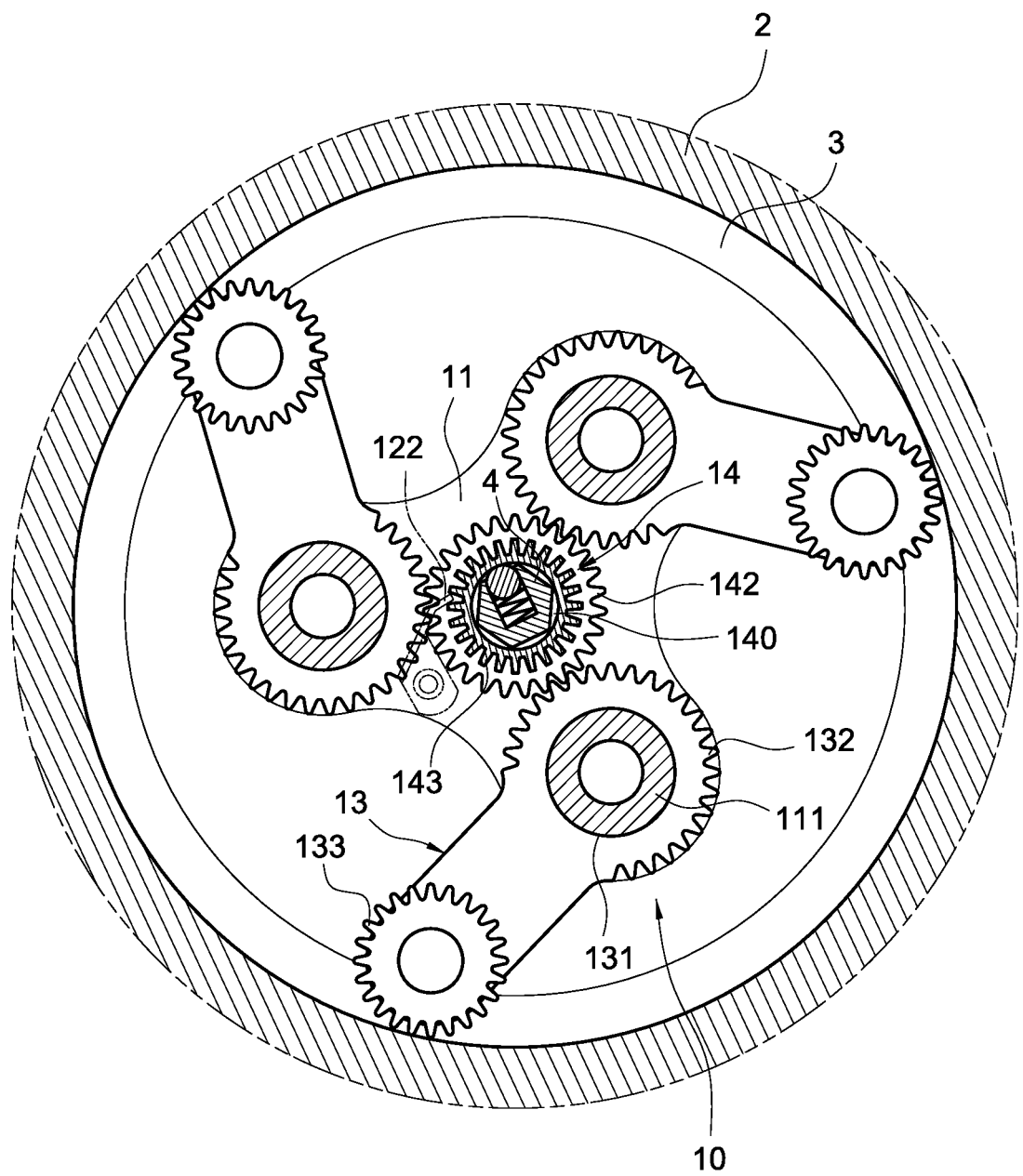
FIG. 7 is a wedging-and-abutting illustration of the telescopically fixing mechanism according to the invention.

Please refer to FIG. 1 through FIG. 3, which respectively are a using illustration, an assembled illustration and a perspective explosive illustration of the decorative lighting device according to the invention attached onto the wheel rim of a vehicle. The decorative lighting device 1 of the invention is adapted by being arranged onto a wheel rim 2, which needs a central hole 3. The decorative lighting device 1 includes a telescopically fixing mechanism 10 and a light-emitting assembly 20.

When arranging the decorative lighting device 1, the telescopically fixing mechanism 10 is first wedged and abutted fixedly in the central hole 3 of the wheel rim 2, and the light-emitting assembly 20 is then connected to the telescopically fixing mechanism 10 to complete the entire assembly process.

The structure of the telescopically fixing mechanism 10 will be described thereinafter. The light-emitting assembly 20 is arranged a lid plate 21 and a plurality of light-emitting units 22 fixed thereon. Shown as a stripe-like configuration, these light-emitting units 22 are disposed by being laid on the lid plate 21. In addition, the light-emitting assembly 20 further includes a positioning plate 23 connected fixedly to the lid plate 21. The positioning plate 23 is arranged a plurality of positioning studs 231, respectively corresponding to which the lid plate 21 is arranged a plurality of fixing holes 211. A screwing part 212 is respectively arranged by being screwed in the positioning studs 231 and the fixing holes 211, such that the lid plate 21 can be connected fixedly onto the positioning plate 23. The periphery of the lid plate 21 is additionally extended to configure a block plate 213, in turn a mask lid being formed.

Moreover, at least one washer 30 can be further arranged by being sandwiched between the positioning plate 23 and the telescopically fixing mechanism 10, such that the arrangement height of the light-emitting assembly 20 can be adjusted. In the present embodiment, there are three washers 30~32 arranged therebetween. Namely, when the surface of the wheel rim 2 has a larger curvature, the number of the arranged washer 30 can be increased.

Please refer to FIG. 4 through FIG. 7 continuously, which separately are a perspective sectional view, a plane assembled illustration, an assembled sectional view and a fixedly wedging-and-abutting illustration of the telescopically fixing mechanism of the invention. In this embodiment, the telescopically fixing mechanism 10 includes a support seat 11, a clipping-and-abutting plate 12 connected fixedly to the support seat 11, a plurality of telescopic links 13, one end of each of which is accommodated between and pivoted to the support seat 11 and the clipping-and-abutting plate 12, and a rotating wheel 14 pivoted to the support seat 11 and driving these telescopic links 13 to make actions of shrinking inwardly or extending outwardly.

The support seat 11 is arranged a plurality of studs 111, fitted onto each of which these telescopic links 13 are separately arranged a fitting hole 131, and corresponded to which the clipping-and-abutting plate 12 is arranged a plurality of perforations 121. The stud 111 of the support seat 11 in sequence passes through the fitting hole 131 of the telescopic link 13 and the perforation 121 of the clipping-and-abutting plate 12. Moreover, the support seat 11 is arranged a support seat hole 110, corresponded to which the clipping-and-abutting plate 12 is arranged a limiting hole 120. By so doing, the rotating wheel 14 is pivoted to the support seat hole 110 and passes through the limiting hole 120.

In this embodiment, the rotating wheel 14 has a rotating axle 141 and a plurality of driving teeth 142 formed over the outer surface of the rotating axle 141. One end of each telescopic link 13 is formed a plurality of driven teeth 132 engaged with these driving teeth 142. Another end of each telescopic link 13 is formed an abutting part 133 abutted fixedly against the central hole 3 of the wheel rim 2 when these telescopic links are being extended outwardly. In this embodiment, the abutting part 133 is a rubber wheel shown as a dentate configuration, by which the frictional force with the wall face of the wheel rim 2 can be enhanced. In addition, a plurality of wedging-and-abutting teeth 143, formed above the driving teeth 142 over the outer surface of the rotating wheel 14, pass through the limiting holes 120 of the clipping-and-wedging plate 12. A pawl 122, arranged at the top face of the clipping-and-abutting plate 12, is arranged by being hooked to one side of the clipping-and-abutting teeth 143. The rotating axle 141 is arranged a rotating hole 140 shown as a hexagonal configuration and adapted for a rotating tool 4 to be inserted therein to rotate the rotating axle 141 and the driving teeth 142.

After assembling the rotating wheel 14, the telescopic links 13 and the clipping-and-abutting plate 12 onto the support seat 11 in sequence with a plurality of screwing holes 232 arranged on the positioning plate 23, a plurality of screws 40 are adapted by being sequentially screwed through the screwing holes 232 of the positioning plate 23, the perforations 121 of the clipping-and-abutting plate 12 and the stud 111 of the support seat 11, such that the clipping-and-abutting plate 12 is connected fixedly onto the support seat 11 and pivoted these telescopic links 13 therebetween, making the positioning plate 23 screwed fixedly to the telescopically fixed mechanism 10. In addition, when at least one washer 30 is sandwiched between the positioning plate 23 and the telescopically fixing mechanism 10, a plurality of fixing holes 300 are arranged on the washer 30 and adapted for the screws 40 to be screwed through.

Accordingly, these driving teeth 142, which are rotated by inserting the rotating tool 4 into the rotating hole 140 of the rotating wheel 14, in turn rotate the driven teeth 132 engaged therewith. Continuously rotating the rotating tool 4, the telescopic links 13 are extended outwardly until the abutting parts 133 have abutted against the wall faces of the central hole 3 of the wheel ring 2. By so doing, the telescopically fixing mechanism 10 is fixedly wedged and abutted between the wall faces of the central hole 3 of the wheel rim 2. In addition, the clipping-and-abutting plate 12 can be further arranged a plurality of positioning holes 123, through a center of each of which a fixing part 124 is arranged to be abutted against the telescopic link 13, thereby, facilitating the positioning of the telescopic links 13.

Figure 8:
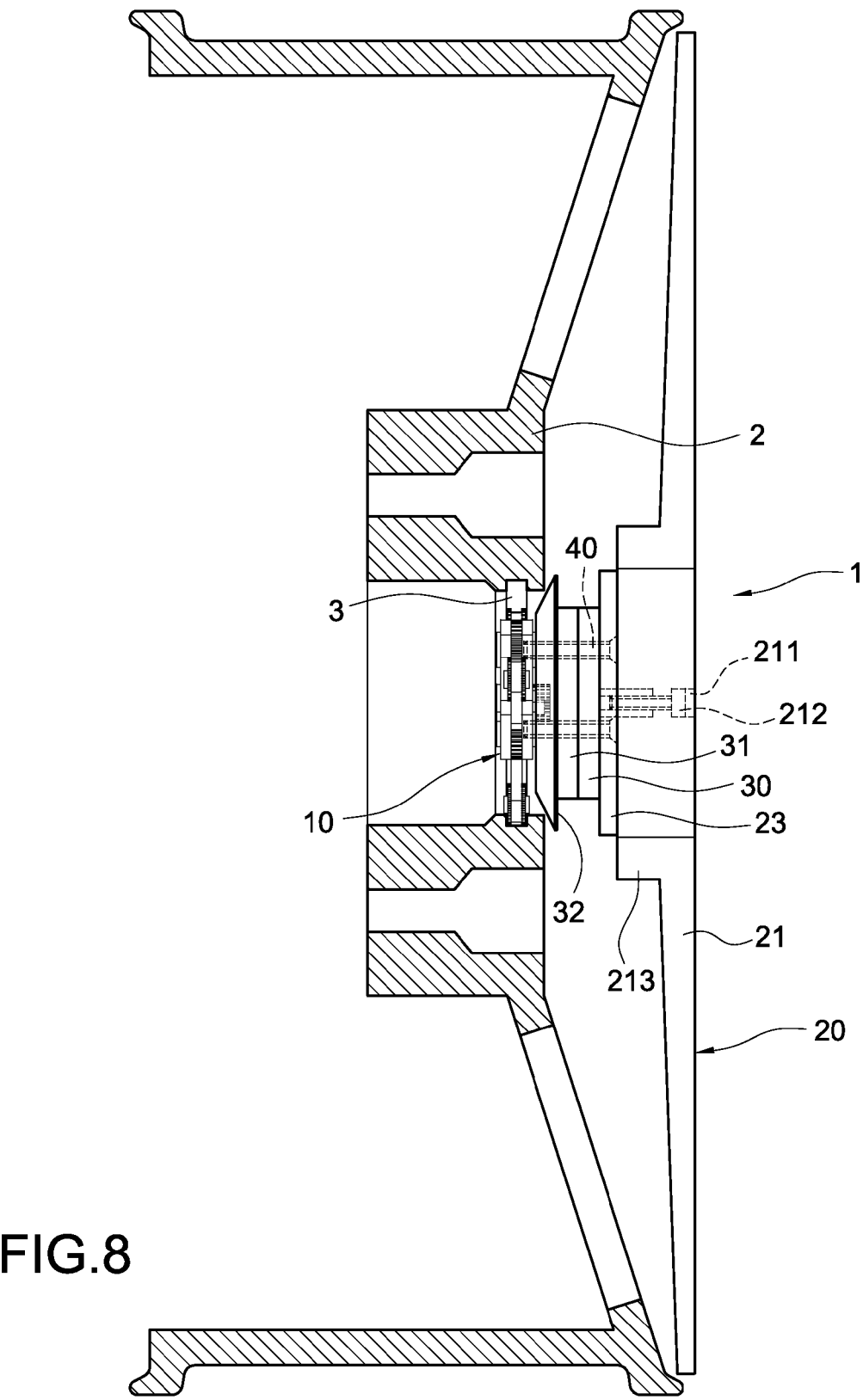
FIG. 8 is an assembled sectional view of the decorative lighting device according to the invention attached onto the wheel rim of a vehicle.

Please refer to FIG. 8, showing an assembled sectional view according to the present invention. As clearly seen in this figure, the telescopically fixing mechanism 10 is fixedly wedged and abutted between the wall faces of the central hole 3 of the wheel rim 2, three washers 30~32 are sandwiched between the light-emitting assembly 20 and the telescopically fixing mechanism 10, and the light-emitting assembly 20 is attached onto the wheel rim 2.

Figure 9:
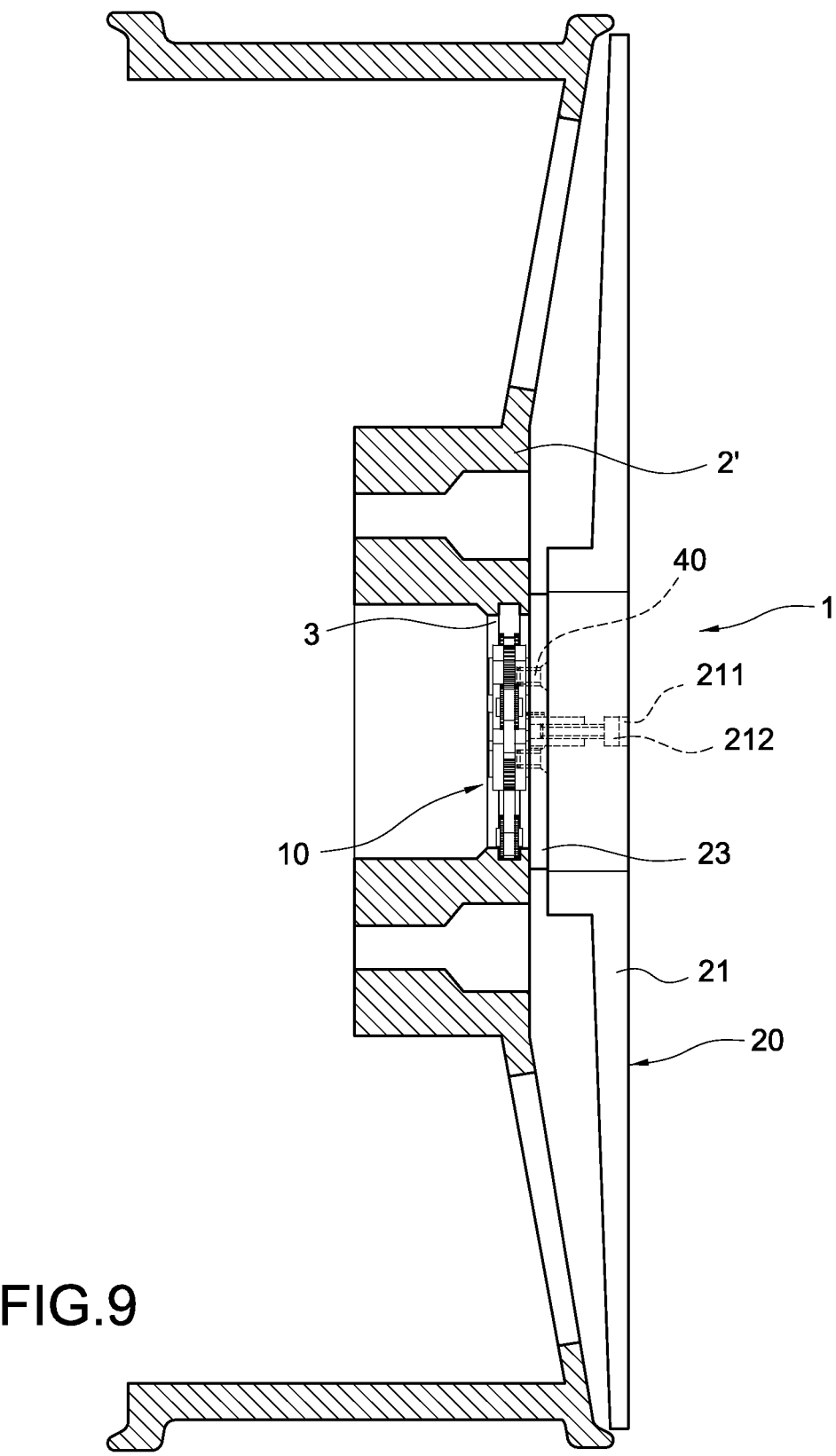
FIG. 9 is another executing status of the decorative lighting device according to the invention attached onto the wheel rim of a vehicle.

Please also refer to FIG. 9, showing another executing status of the decorative lighting device according to the present invention attached onto the wheel rim of a vehicle. This embodiment is substantially same as the aforementioned embodiment, except that when the surface of the wheel rim 2' has a smaller curvature, there is no need to arrange any washer between the light-emitting assembly 20 and the telescopically fixing mechanism 10.

Therefore, through the constitution of aforementioned assemblies, a decorative lighting device attached onto the wheel rim of a vehicle according to the invention is thus obtained.

Summarizing aforementioned description, the decorative lighting device of the invention is an indispensable apparatus adapted by being attached onto the wheel rim of a vehicle indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A decorative lighting device, adapted to be attached onto a vehicle's wheel rim having a central hole, including:
    a fixing mechanism, which includes a support seat, a clipping-and-abutting plate connected fixedly to the support seat, a plurality of swingable links, one pivot end of each of which is accommodated between and pivoted to the support seat and the clipping-and-abutting plate and formed a plurality of driven teeth, and another end of each of which is swingable with respect to the pivot end and arranged an abutting part wedged by being fixed in the central hole of the wheel rim when the swingable links are extended outwardly, and a rotating wheel, which has a rotating axle located on the support seat and capable of driving the swingable links to make actions of shrinking inwardly or extending outwardly, on an outer surface of which a plurality of driving teeth are formed, which are engaged with the driven teeth of the swingable links, respectively; and
    a light-emitting assembly, which is connected to the fixing mechanism and includes a lid plate and a plurality of light-emitting units fixed thereto.

2. The decorative lighting device attached onto wheel rim of vehicle according to claim 1, wherein the support seat is arranged a plurality of studs, fitted onto each of which the swingable links are separately arranged a fitting hole at the pivot end, and corresponded to which the clipping-and-abutting plate is arranged a plurality of perforations, and which in sequence pass through the fitting holes of the swingable links and the perforations of the clipping-and-abutting plate.

3. The decorative lighting device attached onto wheel rim of vehicle according to claim 1, wherein the support seat has a support seat hole, corresponded to which the clipping-and-abutting plate is arranged a limiting hole, and the rotating wheel has the rotating axle located in the support seat hole and passes through the limiting hole.

4. The decorative lighting device attached onto wheel rim of vehicle according to claim 3, wherein the rotating wheel is arranged a plurality of wedging-and-abutting teeth, which are formed at an upper edge of the driving teeth and pass through the limiting hole of the clipping-and-abutting plate having a pawl, which is arranged by hooking one side of the wedging-and-abutting teeth.

5. The decorative lighting device attached onto wheel rim of vehicle according to claim 1, wherein the clipping-and-abutting plate has a plurality of positioning holes, at a center of each of which a fixing piece is arranged to be abutted against the swingable link.

6. The decorative lighting device attached onto wheel rim of vehicle according to claim 1, wherein the light-emitting assembly further includes a positioning plate, which is connected fixedly to the lid plate and screwed fixedly to the clipping-and-abutting plate.

7. The decorative lighting device attached onto wheel rim of vehicle according to claim 6, wherein the fixing plate is arranged a plurality of positioning studs, separately corresponded to each of which the lid plate of the light-emitting assembly is arranged a plurality of fixing holes, and a screwed piece is arranged by being screwed in the positioning stud and the fixing holes to connect the lid plate fixedly onto the positioning plate.

8. The decorative lighting device attached onto wheel rim of vehicle according to claim 1, wherein the light-emitting units shown as a stripe configuration disposed by being laid on the lid plate.

9. The decorative lighting device attached onto wheel rim of vehicle according to claim 1, wherein a periphery of the lid plate is extended outwardly and configured into a block plate shown as a mask lid shape.

10. The decorative lighting device attached onto wheel rim of vehicle according to claim 1, wherein at least one washer can be further arranged between the fixing mechanism and the light-emitting assembly.

* * * * *